United States Patent Office 3,127,769
Patented Apr. 7, 1964

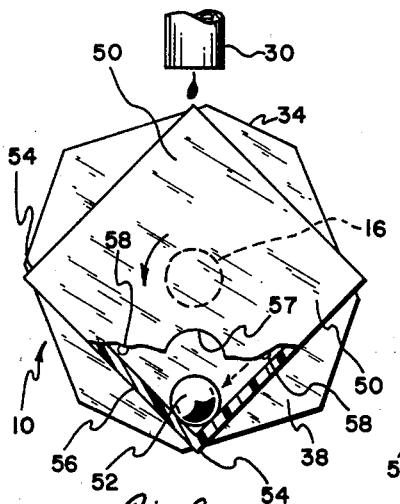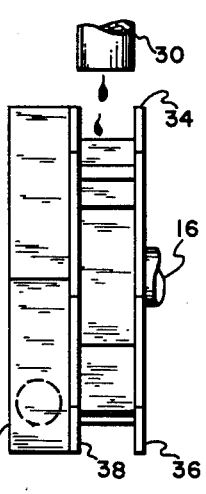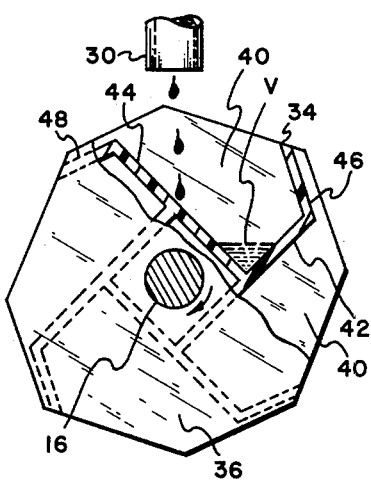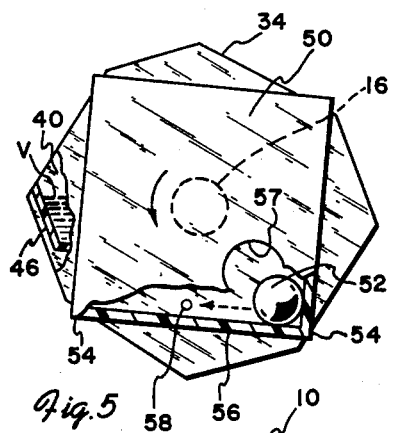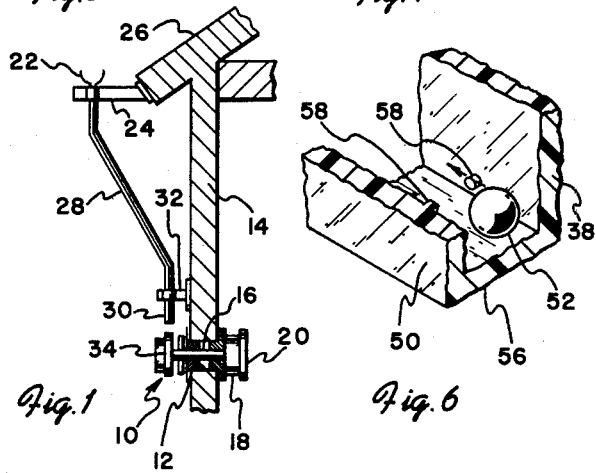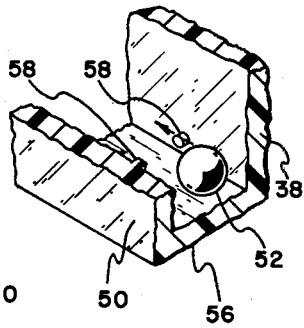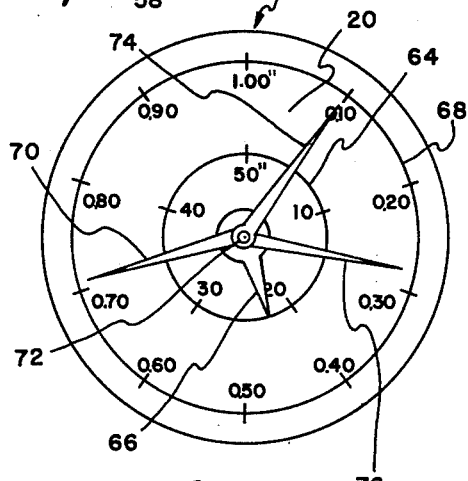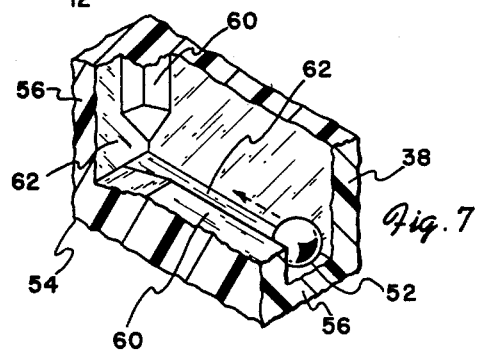

3,127,769
RAIN GAGE
Clifford P. Stucky and Orlin P. Stucky, both of Rte. 2, Box 103, Moundridge, Kans.
Filed June 28, 1962, Ser. No. 206,076
1 Claim. (Cl. 73—171)

This invention relates to an accumulator gage of the positive displacement type. Our gage has a self-emptying feature rendering it particularly adapted for use as a rain gage, because of inherent freedom from damage due to freezing.

In distinction to flowmeters or flow rate gages which operate according to the principles of rate of fluid flow, the principle of the rain gage is to register an accumulated volume of flow with accuracy and the precise instantaneous rate is of the secondary importance, if at all. Therefore, rain gages as a general class are positive displacement devices and, for reasons of reliability and absoluteness of measurement in this regard, they operate in a comparatively slow or static fashion rather than along lines of the dynamic fashion of the flowmeter.

Hitherto, rain gages of residential and similar types have consisted primarily of open receptacles with the inside volume graduated and having predetermined capacity. Readings are taken at intervals during and following periods of precipitation. It is usual to empty these gages while the reader is in attendance if, at the time, he notes or records the reading. Thus, the gage and the meticulous records which are sometimes desired require personal attention, and the emptying of the conventional gage is one more thing to look after; the latter is desirable to prevent loss of a reading from overflow and is particularly desirable when the weather is attended by temperature swings, to prevent the gage from becoming frozen and being permanently damaged due to the expanded contents.

The gage according to our invention reduces or eliminates the foregoing difficulties of freeze damage, and also the requirement of close attention and the keeping of meticulous records, as will now be explained. The present gage is accurate and reliable, it is essentially automatic in operation, and as already indicated, is self-emptying. Further features, objects and advantages will either be specifically pointed out or become apparent when, for better understanding of the invention, reference is made to the following description, taken in conjunction with the accompanying drawing which forms a part thereof and in which:

FIGURE 1 is a sectional view in elevation of the outside wall of a room in a building structure to which a device embodying the present invention is shown applied;

FIGURES 2, 3 and 4 are respectively an elevational view taken from one end, a side view, and an elevational view taken from the other end of the rotor portion of the device of FIGURE 1;

FIGURE 5 is a view similar to FIGURE 2 but showing the device rotated into a different operating position;

FIGURE 6 is a perspective view showing the ball trackway and retarding means of an escapement mechanism in the preferred embodiment of the invention;

FIGURE 7 shows a modified ball trackway; and

FIGURE 8 is a face view in elevation of the dial indicator provided for the device and located inside the room of FIGURE 1.

More particularly in FIGURE 1 of the drawing, our rain gage device generally indicated by the numeral 10 is mounted in an opening 12 in the outside wall 14 of a room in a structure such as a residence. The gage drives a shaft 16 which through reduction gearing mechanism 18 turns the hands of a dial indicator 20 which is read inside the room.

A rain cup 22 is secured by a bracket 24 to the residence at a point offset from the eaves 26 enabling it to catch precipitation freely. The cup 22 is connected by a hollow conduit 28 so as to deliver water through a vertically disposed supply mouth 30. A bracket 32 secured to the residence holds the supply mouth in direct registry with the rotor 34 of the rain gage 10 and both the supply mouth and the rotor are inwardly offset below the eaves 26 so that only liquid fed from the cup 22 will be registered by the gage. The rotor 34 turns by steps in part revolutions. It rotates the shaft 16 and, as seen from the other figures, includes two spaced-apart polygonal plates 36 and 38 at the sides. Transversely disposed swastika-like panels define deep, outwardly open pockets 40 between the plates for catching water; each pocket 40 is fluid-tight and consists of a bottom 42 and outwardly divergent inner and outer sides 44 and 46. These sides are all backwardly turned and similarly a lip 48 on the inner side 44 is backwardly turned. Rain water from the source 30 accumulates in a volume V in the particular pocket 40 which is upwardly extending at the time; there are four such pockets in the embodiment illustrated.

In order to provide continuous torque always in the same direction, the rotor is arranged with the center of volume of each upwardly extending pocket 40 eccentric to the centerline of the shaft 16. As the volume V of water increases in each pocket, the pocket revolves in the direction of the arrow and, accordingly, the center of gravity of the water shifts farther to the side of the axis of shaft 16 as seen in FIGURE 5.

An escapement mechanism consists of a square-shaped box which is closed by an end wall 50 at one end and which is secured to the rotor side plate 38 so that the plate 38 forms the end wall at the opposite end. A captive ball 52, which lodges in successive corners 54 of the square box, rolls along the track formed by the square sides 56 of the box as the rotor 34 rotates. The end wall 50 has an access opening 58 therein for the ball and the diameter somewhat exceeds the ball diameter.

As the volume V of water accumulates in the currently upwardly open pocket 40 according to FIGURE 4, the weight causes the ball 52 and the box corner 54 occupied thereby to swing in an arc from below the shaft 16 upwardly and to the opposite side of the vertical plane of that shaft. The ball 52 continues to be lifted to a point where it counters the weight of the volume V in a balanced position as shown in FIGURE 5. The addition of slightly more water, so as to total a predetermined amount, disturbs this balance and the ball 52 rolls in the direction of the dotted arrow as viewed in FIGURE 5 and transfers into the opposite corner 54. Simultaneously the volume V is dumped from the pocket 40 as it lowers and the next successive upwardly open pocket starts receiving water from the source 30.

In one physically constructed embodiment of the invention, it was observed that the ball 52, due to its own momentum and the momentum of the rotor 34 after it started the shift from an occupied corner, sometimes kept rolling past the next corner and stopped in the diagonally opposite corner. We have overcome the possibility of erratic behavior through control of the curvature or arch or by otherwise controlling the square sides 56 to retard the ball motion.

In FIGURES 5 and 6, short projecting studs 58 are provided in the path of the ball 52. They cause a slight transverse deflection in its motion and for this purpose are located at a point slightly past the midway mark in the travel of the ball along each of the sides 56. This location insures that the ball can complete each transfer in an orderly fashion, and slows it sufficiently to prevent overtravel.

In the modification of FIGURE 7, alternate left and right ramps 60 are provided on the inner faces of the sides 56 so as to define a zigzag trackway 62. Thus in reaching each corner 54, the ball tends to stop in that corner due to the fact that it would be forced to zigzag in effort to reach the subsequent corner prematurely.

On the face of the dial 20 of FIGURE 8, we provide an inner circle 64 of markings giving a scale reading of fifty inches of rainfall. The reduction gearing 18 driven by the shaft 16 turns a hollow outer shaft, not shown, on which a short hand 66 is fixed and the ratio provides a full revolution of the hand 66 corresponding to each fifty inches of rainfall.

An outer circle 68 on the dial is marked in hundredths of an inch of rainfall and a shaft 72 driven by the gearing 18 moves a fine hand 70 through a complete revolution for each 1.00 inch of rainfall measured.

The shaft 72 carries another hand 74 having a light frictional fit thereon so that the hand 74 can be reset after each rainfall if the user desires. A third hand 76 on this common shaft 72 likewise has a light frictional fit and it can be reset to zero, for example, at the end of every month or at the end of any other period under particular observation.

In one physically constructed embodiment of the invention, the ball 52 was a steel ball and the entire rotor 34 and box with the square sides 56 were plastic. The weights, volumes, and gear ratios selected produced results correlated as follows:

| Rainfall | Ball 52 | Hand 70 |
| --- | --- | --- |
| ½" rain | 10 clicks | 2½ revolutions |

A moderate rainfall accumulates to the above one-half inch amount sometimes in an hour's time and in this period the ball 52 audibly moves from one corner to the next, making a total of ten audible clicks; in other words, each time the ball clicks into the next corner, the rainfall has accumulated by another 0.05 inch.

If a dial 20 is used of a type which requires more greatly multiplied movement of the hands, the increase of movement of the hands, the increase of movement can be readily accomplished by enlarging the rain cup 22, by reducing the weight of the ball 52, by reducing the size of the sides 56 of the box, or by reducing the ratio of the reduction gearing 18. To do oppositely results in making the gage 10 less sensitive, which can be desirable in some cases.

It is noted that each time the ball 52 transfers to the next corner 54, the trapped fluid is all or substantially all emptied and so freezing damage is no particular problem with this continuously emptying gage device. The device is found to be a real convenience inasmuch as the user merely stays within the room of the building and reads the dial 20 on the wall. No attention is required for emptying the gage; the reading per rainfall and the reading per month, for example, are accurately retained by the hands 74 and 76 with no requirement that water keep accumulating in volume in the gage. Total readings are, of course, evident from the fine reading hand 70 and from the short hand 66 which reads in large quantities.

Variations within the spirit and scope of the invention described are equally comprehended by the foregoing description.

What is claimed is:

A rain gage comprising, in combination; a rotor having a horizontal axis of rotation; there being a set of circumferentially spaced apart, outwardly open pockets which are provided about said rotor, and the volumetric center of which when each is in an upwardly extending position being eccentric to the axis of rotation of said rotor; an equiangular box secured to the rotor in symmetrical disposition about said axis; a captive ball in the box adapted to roll, under gravity, from corner to corner as the rotor pockets fill with liquid; internal obstacles in said box in the path of the ball to limit its rolling velocity to movement such that it transfers from one corner no farther than the next corner and stops; and an indicator device driven by the rotor and having indicator hands and a dial providing readings in terms of cumulative rainfall.

References Cited in the file of this patent

UNITED STATES PATENTS

| | | |
| --- | --- | --- |
| 25,948 | Burnel | Nov. 1, 1859 |
| 1,092,082 | Staaf et al. | Mar. 31, 1914 |
| 1,188,215 | Staaf | June 20, 1916 |